April 26, 1932.  A. F. MASURY  1,855,642
FRONT WHEEL DRIVE FOR TWO-WHEEL CHASSIS
Filed April 18, 1931   2 Sheets-Sheet 1

INVENTOR
Alfred F. Masury,
BY Redding, Greeley, O'Shea & Campbell
HIS ATTORNEYS

April 26, 1932.  A. F. MASURY  1,855,642

FRONT WHEEL DRIVE FOR TWO-WHEEL CHASSIS

Filed April 18, 1931  2 Sheets-Sheet 2

INVENTOR
Alfred F. Masury,
BY
Redding, Greeley, O'Shea & Campbell
HIS ATTORNEYS

Patented Apr. 26, 1932

1,855,642

UNITED STATES PATENT OFFICE

ALFRED F. MASURY, OF NEW YORK, N. Y., ASSIGNOR TO INTERNATIONAL MOTOR COMPANY, OF NEW YORK, N. Y., A CORPORATION OF DELAWARE

FRONT WHEEL DRIVE FOR TWO WHEEL CHASSIS

Application filed April 18, 1931. Serial No. 531,040.

The present invention relates to vehicle chassis constructions and embodies, more specifically, an improved construction, wherein the chassis is provided with two driving and steering wheels, a third dolly wheel being provided for supporting the chassis temporarily during the periods when it may be disconnected from a cooperating unitary body member. The invention is further adapted to be used in connection with various types of vehicle bodies, it preferably being connectible and disconnectible therefrom readily in order that a more economical use of the bodies and chassis may be effected.

With the foregoing in view, it is an object of the invention to provide an improved vehicle chassis which is a complete and mobile power unit, this unit being dirigible in character and adapted to be readily connected to and disconnected from trailing unitary body portions.

A further object of the invention is to provide a device of the above character wherein the space utilized by the power units and other trailing elements is economized and the elements rendered readily accessible to facilitate the inspection and repair thereof.

Further objects, not specifically enumerated above, will be apparent as the invention is described in greater detail in connection with the accompanying drawings, wherein.

Figure 1:
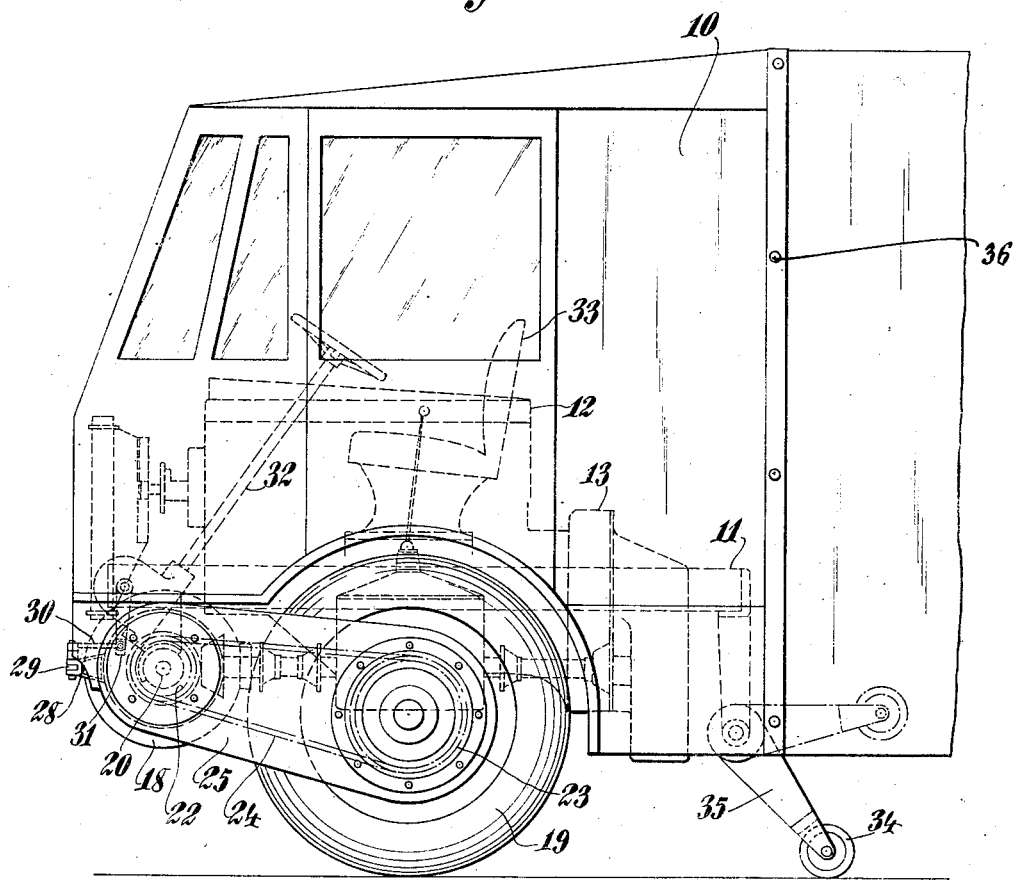
Figure 1 is a view in side elevation, showing a vehicle chassis constructed in accordance with the present invention.
Figure 2:
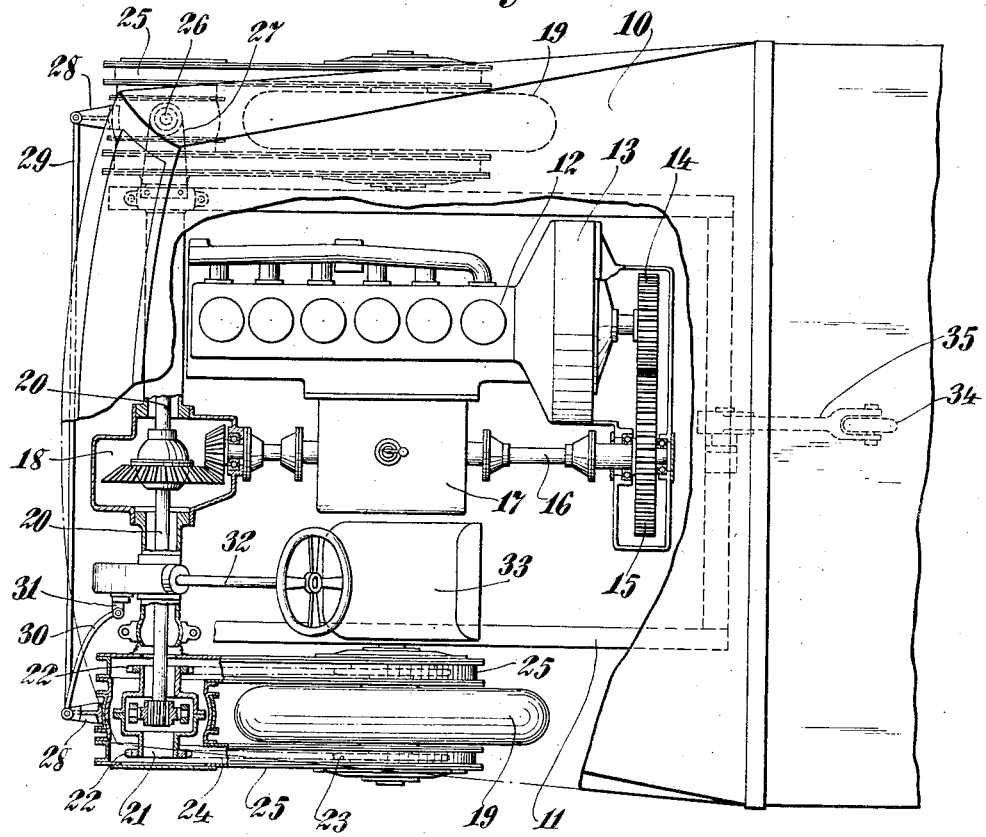
Figure 2 is a plan view, partly broken away and in section, showing the driving and steering elements more fully.

Referring to the above drawings, the invention comprises a cab or other enclosing means 10 which is mounted upon frame members 11. These frame members may be in the form of longitudinally extending struts as shown, or they may be in any other desired form as long as they are adapted to serve as a base for the elements to be described hereinafter. Within the cab and carried by the frame members is an internal combustion engine 12 which drives a clutch 13 and gear 14. Gear 14 drives a gear 15 which transmits the drive to shaft 16 and transmission 17. The gears 14 and 15, together with the clutch 13 may be carried as a unit with the engine 12 and the power is thus carried forwardly from the rear of the cab, through the transmission, to a final drive 18. From this drive, power is apportioned between wheels 19 by means of jack shafts 20 and suitable driving connections 21. In the form shown, jack shafts 20 drive universal joints which carry pairs of sprockets 22, connected to driven sprockets 23 by means of chains 24. The driven sprockets are mounted on the stub shafts carrying the wheels 19 and the drive is thus transmitted thereto in a convenient fashion.

Wheels 19 are mounted within saddles 25 which are trunnioned upon a vertical axis at 26 in brackets 27. Arms 28 are secured to the saddles and are connected together by a tie rod 29, a drag link 30 connecting these steering elements to the steering arm 31 of a steering mechanism actuated by the steering column 32.

A driver's seat 33 is mounted beside the transmission 17 and thus conserves the space otherwise required for such seat, rendering the overall length of the unit considerably less than that required by the corresponding portion of motor vehicle units of this character now available.

Rearwardly of the cab 10, a dolly wheel 34 is provided, this wheel being mounted upon arm 35 which may be adjustably mounted upon the frame of the unit in order that it may be fixed in an operative position as shown in Figure 1, or an inoperative position as indicated in dot and dash lines in Figure 1. In this fashion, when the cab is disconnected from an integral trailing body unit the dolly wheel is dropped to support the cab until it is connected with another body unit. Bolts 36 or other suitable means may be provided to secure the chassis to the integral body units.

It will thus be seen that a complete unit is afforded which incorporates all of the elements of a complete vehicle chassis. This unit may be backed into and attached to any type of trailer body the attaching being effected by means of pins or other mechanism.

While the invention has been described with specific reference to the accompanying drawings, it is not to be limited, save as defined in the appended claim.

I claim as my invention:

In a vehicle chassis including forward driving and steering wheels, an engine mounted thereon, a transmission mounted beside the engine, and a driver's seat mounted beside the transmission, the engine, transmission, and seat being substantially aligned transversely of the chassis, a final drive forwardly of the transmission, means to drive the final drive from the engine and transmission, means to secure the chassis to a trailing body element to maintain the chassis in a horizontal plane, and a dolly wheel mounted on the chassis rearwardly of the front wheels, said wheel being movable to a supporting and a non-supporting position.

This specification signed this 16th day of April A. D. 1931.

ALFRED F. MASURY.